United States Patent
Lu et al.

(10) Patent No.: US 9,599,165 B2
(45) Date of Patent: Mar. 21, 2017

(54) RETAINER FOR A ROLLING BEARING

(71) Applicant: JOHNSON ELECTRIC S.A., Murten (CH)

(72) Inventors: Ming Cen Lu, Shenzhen (CN); James Ching Sik Lau, Hong Kong (CN); Xi Ping Yang, Shenzhen (CN); Chi Keung Law, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/813,962

(22) Filed: Jul. 30, 2015

(65) Prior Publication Data

US 2016/0032980 A1   Feb. 4, 2016

(30) Foreign Application Priority Data

Jul. 31, 2014  (CN) .......................... 2014 1 0374504

(51) Int. Cl.
*F16C 35/067*   (2006.01)
*F16C 35/077*   (2006.01)
*F16C 27/04*   (2006.01)
*F16C 19/06*   (2006.01)

(52) U.S. Cl.
CPC ............ *F16C 35/067* (2013.01); *F16C 27/04* (2013.01); *F16C 35/077* (2013.01); *F16C 19/06* (2013.01); *F16C 2380/26* (2013.01)

(58) Field of Classification Search
CPC .......... F16C 27/00; F16C 27/04; F16C 27/06; F16C 27/066; F16C 35/06; F16C 35/067; F16C 35/07; F16C 35/077; F16C 19/06; F16C 2380/26
See application file for complete search history.

(56) References Cited

U.S. PATENT DOCUMENTS

| 3,018,146 | A | * | 1/1962 | Euwe | B60P 1/52 384/299 |
|---|---|---|---|---|---|
| 3,415,500 | A | * | 12/1968 | Pethis | F16C 27/066 126/113 |
| 3,709,570 | A | * | 1/1973 | Galbato | F16C 27/04 267/161 |
| 4,398,774 | A | * | 8/1983 | Voll | F16C 27/04 384/493 |
| 5,033,875 | A | * | 7/1991 | Moulinet | B60K 17/24 384/536 |
| 5,044,789 | A | * | 9/1991 | Damon | F16C 35/077 384/535 |
| 5,061,089 | A | * | 10/1991 | Bair | F16C 19/54 384/517 |
| 5,314,255 | A | * | 5/1994 | Schwerdt | F16C 27/066 384/215 |

(Continued)

*Primary Examiner* — Alan B Waits
(74) *Attorney, Agent, or Firm* — Muncy, Geissler, Olds & Lowe, P.C.

(57) ABSTRACT

A fastening device for a rolling bearing includes a bearing mounting portion disposed at an end of a motor housing, a rolling bearing received in the mounting portion, and a retainer ring disposed between an inner peripheral surface of the mounting portion and a peripheral surface of an outer ring of the rolling bearing. The rolling bearing is fastened to the motor housing by the retainer ring. The retainer ring is resiliently deformable in the radial direction of the rolling bearing.

7 Claims, 3 Drawing Sheets

(56) References Cited

U.S. PATENT DOCUMENTS

| | | | | |
|---|---|---|---|---|
| 5,501,531 | A | * | 3/1996 | Hamaekers ............ F16C 27/066 384/536 |
| 5,862,706 | A | * | 1/1999 | Chen ..................... F16H 1/48 384/536 |
| 5,931,585 | A | * | 8/1999 | Malchow .............. F16C 25/083 384/535 |
| 6,044,723 | A | * | 4/2000 | Eda ..................... B62D 5/0409 180/443 |
| 6,422,947 | B1 | * | 7/2002 | Kelly .................... B60K 17/24 464/178 |
| 6,948,857 | B2 | * | 9/2005 | Schuetz ................ F16C 23/084 384/498 |
| 7,611,288 | B2 | * | 11/2009 | Lew ..................... B60K 17/24 29/898.07 |
| 7,648,277 | B2 | * | 1/2010 | Laurant .................. F16C 27/04 384/99 |
| 7,771,126 | B2 | * | 8/2010 | Faass ..................... B64C 27/14 248/580 |
| 8,267,592 | B2 | * | 9/2012 | Godleski ............... F01D 25/164 384/558 |
| 2008/0025655 | A1 | * | 1/2008 | Creviston ............... F16C 19/52 384/45 |
| 2016/0097424 | A1 | * | 4/2016 | Hafermalz ........... F16H 57/039 74/425 |

\* cited by examiner

RETAINER FOR A ROLLING BEARING

CROSS REFERENCE TO RELATED APPLICATIONS

This non-provisional patent application claims priority under 35 U.S.C. §119(a) from Patent Application No. 201410374504.X filed in The People's Republic of China on Jul. 31, 2014, the entire contents of which are hereby incorporated by reference.

FIELD OF THE INVENTION

This invention relates to an electric motor and in particular, to a fixing device for a rolling bearing, such as a ball bearing, roller bearing, needle bearing, etc.

BACKGROUND OF THE INVENTION

Massage beds are used in physiotherapy clinics, hospitals, beauty shops, and spa resorts. As people become increasingly health conscious, more and more massage beds are required.

A typical massage bed includes multiple internal massage units each having a motor mounted therein. A shaft of the motor is connected to an eccentric wheel. When the motor is turned on, the shaft rotates the eccentric wheel. The rotating eccentric wheel contacts a surface of the massage bed to produce vibrations to massage corresponding body parts.

The above motor employs a rolling bearing to support the shaft. Referring to FIG. 1, when a rolling bearing 100 is assembled in a bearing hub or bearing mounting portion 310 at an end of a motor housing 300, a radial gap is formed between an inner diameter of the mounting portion 310 and an outer diameter of the rolling bearing 100. This gap is filled with glue to rigidly fix the bearing to the bearing mounting portion. However, over time the vibration and heat will cause the glue to crack of otherwise release the bearing leading to failure of the motor. Alternatively, a larger gap may be provided which is filled with a rubber sleeve or rubber bushing. However, this method is not reliable. Experiments indicate that, after the motor runs for 200 hours, the rubber bushing becomes loose and fails due to the radial eccentric alternating load produced during operation of the massage bed, leading to failure of the motor.

SUMMARY OF THE INVENTION

Hence there is a desire for a retainer for a rolling bearing which has a reliable fastening effect and wide applicability.

Accordingly, in one aspect thereof, the present invention provides a fastening device for a rolling bearing. The fastening device includes a bearing mounting portion disposed at an end of a motor housing, a rolling bearing received in the mounting portion, and a resilient retainer ring retained between an inner circumferential surface of the mounting portion and a surface of an outer ring of the rolling bearing. The rolling bearing is fastened to the motor housing by the retainer ring. The retainer ring has resilience in a radial direction.

Preferably, the retainer ring comprises a first abutting portion and a second abutting portion extending in parallel along a radial direction of the rolling bearing, an inner annular portion interconnecting the first abutting portion and the second abutting portion, and an outer annular portion connected to an edge of the second abutting portion; the first abutting portion abuts against an end face of the outer ring of the rolling bearing, the inner annular portion abuts against at least a portion of an outer circumferential surface of the outer ring of the rolling bearing, and the outer annular portion is inclined and has a radial size gradually increasing from the second abutting portion toward the first abutting portion.

Preferably, the inner annular portion is inclined and has a radial size gradually increasing from the first abutting portion toward the second abutting portion.

Preferably, the inner annular portion abuts against the entire outer circumferential surface of the outer ring of the rolling bearing.

Preferably, the fastening device further includes a washer engaged between an end face at an inside of the mounting portion and an end face of the outer ring of the rolling bearing, and the second abutting portion of the retainer ring abuts against the washer.

Preferably, an axial length of the inner annular portion is greater than an axial length of the outer annular portion.

Preferably, material of the retainer ring is either stainless steel or carbon steel.

Preferably, the fastening device further includes a bearing positioning ring disposed at each axial end of the rolling bearing, an inner ring of the rolling bearing and the bearing positioning rings are fixed to a shaft of the motor, and the shaft passes through the bearing mounting portion, the rolling bearing and the bearing positioning rings.

Preferably, the retainer ring includes a first abutting portion and a second abutting portion extending in parallel along a radial direction of the rolling bearing, an inner annular portion interconnecting the first abutting portion and the second abutting portion, and an outer annular portion connected to an edge of the second abutting portion. The outer annular portion abuts against the bearing mounting portion. At least one of the outer annular portion and the bearing mounting portion, the inner annular portion and the outer annular portion, and the inner annular portion and the rolling bearing defines a wedge-shape gap there between such that the retainer ring is capable of radial deformation.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
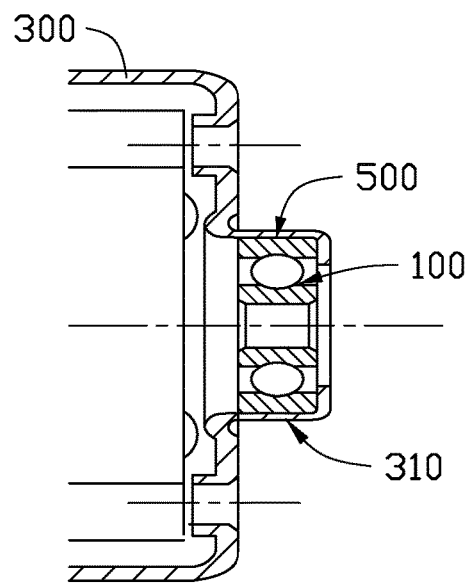
FIG. 1 is a cross-sectional view of a conventional fastening device for a rolling bearing.
Figure 2:
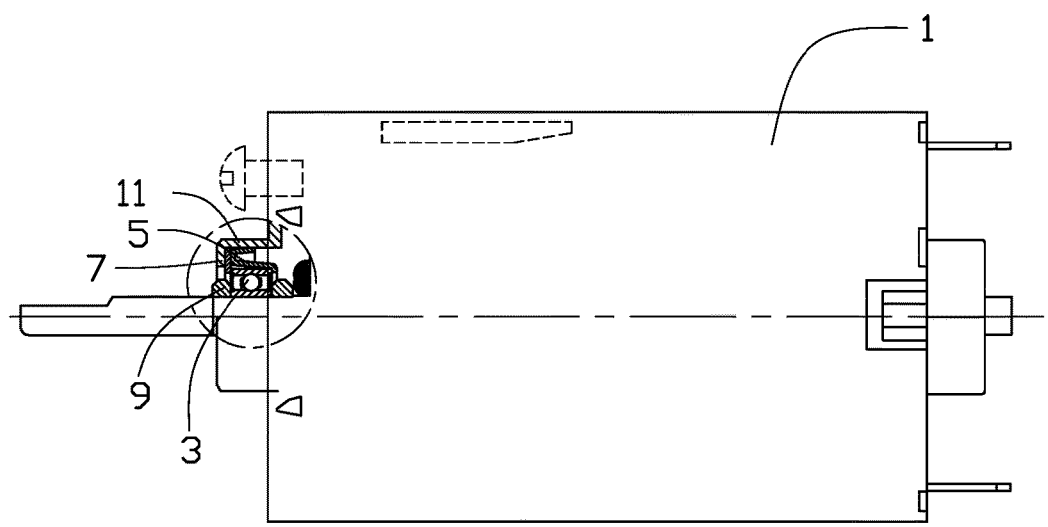
FIG. 2 is a partial, sectional view of a fastening device for a rolling bearing according to one embodiment.
Figure 3:
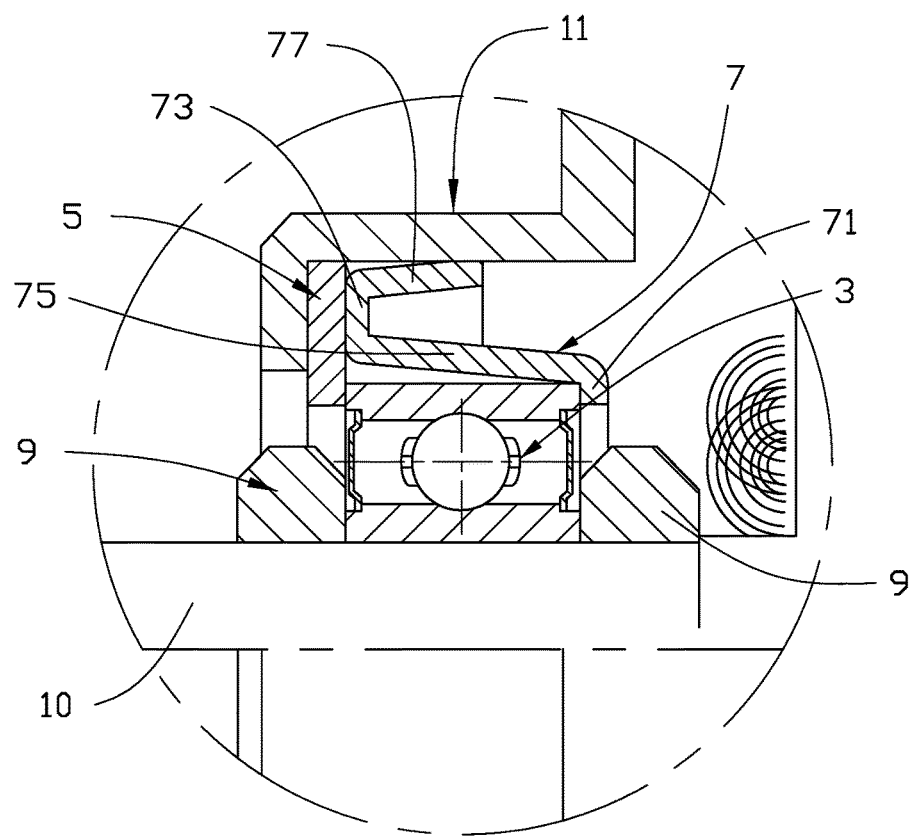
FIG. 3 is an enlarge view of the encircled portion of FIG. 2.

Referring to FIG. 2 and FIG. 3, a fastening device for a rolling bearing in accordance with the preferred embodiment of the present invention includes a bearing mounting portion 11 disposed at an end of a motor housing 1, a rolling bearing 3 disposed in the mounting portion 11, a washer 5 disposed between an inner end face of the mounting portion 11 that is perpendicular to an axial direction of the motor (the term "end face" refers to the faces perpendicular to the axial direction of the motor) and an end face of the rolling bearing 3, a retainer ring 7 disposed between an inner peripheral surface of the mounting portion 11 that is parallel to the axial direction of the motor (the term "peripheral surface" refers to the surfaces parallel to the axial direction of the motor) and a radially outer peripheral surface of an outer ring of the rolling bearing 3, and bearing positioning rings 9 disposed at the axial ends of the rolling bearing 3.

Figure 4:
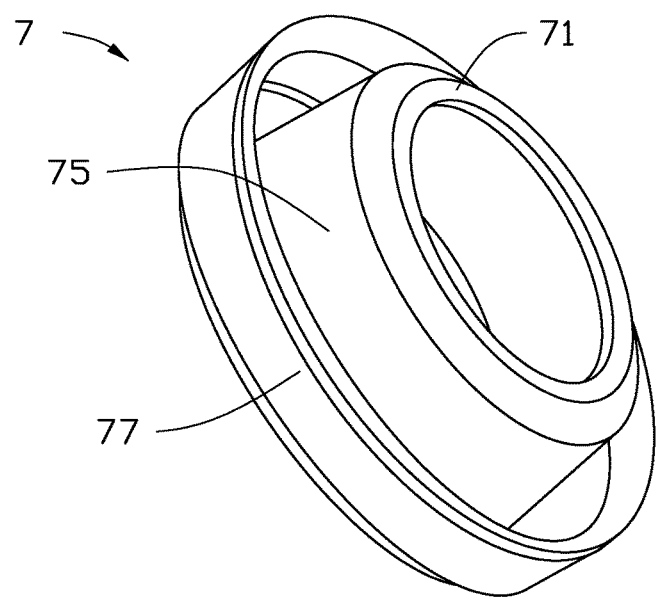
FIG. 4 is a perspective view of a retainer ring of the rolling bearing fastening device.
Figure 5:
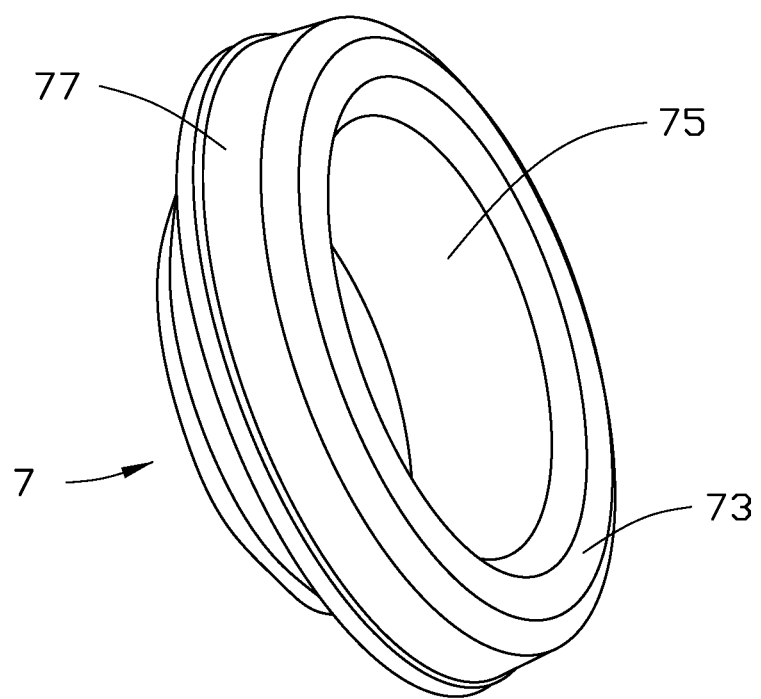
FIG. 5 is a perspective view of the retainer ring of FIG. 4, viewed from another side.

Preferably, the rolling bearing 3 includes an inner ring fixed to a shaft of the motor, an outer ring, and balls or rollers disposed between the inner ring and the outer ring. Referring to FIG. 4 and FIG. 5, the retainer ring 7 includes a first abutting portion 71 and a second abutting portion 73, an inner annular portion 75 interconnecting the first and second abutting portions 71, 73, and an outer annular portion 77 connected to an edge of the second abutting portion 73. The first abutting portion 71 extends in the radial direction of the rolling bearing 3 and abuts against an end face of the outer ring of the rolling bearing 3. The second abutting portion extends in the radial direction of the ball bearing 3 and abuts against the washer 5. The inner annular portion 75 is inclined and has a radial size gradually increasing in a direction from the first abutting portion 71 toward the second abutting portion 73. The outer annular portion 77 is inclined and has a radial size gradually increasing in a direction from the second abutting portion 73 toward the first abutting portion 71. The rolling bearing 3 is fastened by the outer annular portion 77 abutting against an inner circumferential surface of the mounting portion 11 and the inner annular portion 75 abutting against the surface of the outer ring of the rolling bearing 3. That is, the rolling bearing 3 is fastened by the retainer ring 7. The retainer ring 7 has resilience in the radial direction.

Preferably, an axial length of the inner annular portion 75 is greater than an axial length of the outer annular portion 77.

In order to ensure that the rolling bearing 3 is fastened by the retainer ring 7, the retainer ring 7 may be made from stainless steel or carbon steel.

The bearing positioning rings 9 are fixed on the shaft 10 to position and support the rolling bearing 3 against axial movement.

After the retainer ring 7 is assembled between the inner peripheral surface of the bearing mounting portion 11 and the outer peripheral surface of the outer ring of the rolling bearing 3, the outer annular portion 77 of the retainer ring 7 is squeezed by the inner circumferential surface of the mounting portion 11. Correspondingly, the outer annular portion 77 produces a force such that the inner annular portion 75 presses against the surface of the outer ring of the rolling bearing 3 to thereby reliably hold the rolling bearing 3. When the rolling bearing 3 experiences a radial load, in particular, a radial eccentric alternating load during operation of massage bed, the retainer ring 7 constantly grips the rolling bearing 3, thereby greatly prolonging the lifetime of the motor. Preferably, the inner annular portion 75 engages the outer surface of the outer ring of the rolling bearing 3 only at a region adjacent the axial end in contact with the first abutting portion 71 of the retainer ring 7.

In the above embodiment, the washer 5 is configured to rest against the end face of the outer ring of the rolling bearing 3, which prevents the rolling bearing 3 from easily becoming disengaged from the retainer ring 7. In another embodiment, the end face of the mounting portion 11 against which the washer 5 as shown in FIG. 3, can be extended to directly engage the end face of the outer ring of the rolling bearing 3. In such case, the washer 5 can be omitted.

In the above embodiment, the resilience of the retainer ring 7 in the radial direction permits a certain degree of shaft wobble. In another embodiment, the inner annular portion 75 may extend axially to abut against the entire circumferential surface of the outer ring of the rolling bearing 3. In still another embodiment, the inner annular portion 75 is bent such that the cross section of the inner annular portion 75 is V-shaped, and a middle of the inner annular portion 75 abuts against the outer circumferential surface of the outer ring of the rolling bearing, and the outer annular portion 77 remains inclined. Therefore, a wedge-shaped gap is formed between the outer annular portion and the bearing mounting portion, the inner annular portion and the outer annular portion, or the inner annular portion and the rolling bearing, such that the retainer ring is capable of radial deformation.

In summary, in the rolling bearing fastening device as described above, a resilient retainer ring is disposed between the inner circumferential surface of the bearing mounting portion at the end of the motor housing and the surface of the outer ring of the rolling bearing. The rolling bearing is reliably fastened by the retainer ring, thereby prolonging the lifespan of the motor. In addition, the rolling bearing fastening device has a wide applicability, being useful for other motors having a high radial vibration loading, as well as for motors for massage beds and chairs.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A fastening device for a rolling bearing, comprising a bearing mounting portion receiving the rolling bearing, and a retainer ring retained between an inner circumferential surface of the mounting portion and a surface of an outer ring of the rolling bearing, the rolling bearing being fastened to the bearing mounting portion by the retainer ring;
   wherein the retainer ring has a resilience in a radial direction of the rolling bearing; and
   wherein the retainer ring comprises a first abutting portion and a second abutting portion extending in parallel along a radial direction of the rolling bearing, an inner annular portion interconnecting the first abutting portion and the second abutting portion, and an outer annular portion connected to an edge of the second abutting portion; the first abutting portion abuts against an end face of the outer ring of the rolling bearing, the inner annular portion abuts against at least a portion of an outer circumferential surface of the outer ring of the rolling bearing, and the inner annular portion is inclined and has a radial size gradually increasing from the first abutting portion towards the second abutting portion.

2. The fastening device of claim 1, wherein the outer annular portion is inclined and has a radial size gradually increasing from the second abutting portion towards the first abutting portion.

3. The fastening device of claim 2, wherein the inner annular portion abuts against a portion of the outer peripheral surface of the outer ring of the rolling bearing adjacent the axial end in contact with the first abutting portion.

4. The fastening device of claim 2, wherein an axial length of the inner annular portion is greater than an axial length of the outer annular portion.

5. The fastening device of claim 1, further comprising a washer located between an inner end face of the mounting portion and an end face of the outer ring of the rolling bearing, the second abutting portion of the retainer ring abutting against the washer.

6. The fastening device of claim 1, wherein the retainer ring is composed of stainless steel or carbon steel.

7. The fastening device of claim 1, wherein the outer annular portion abuts against the bearing mounting portion, at least one of the outer annular portion and the bearing mounting portion, the inner annular portion and the outer annular portion, and the inner annular portion and the rolling bearing defines a wedge-shape gap there between such that the retainer ring is capable of resilient radial deformation.

* * * * *